(12) United States Patent
Smythe, Jr.

(10) Patent No.: US 6,615,557 B2
(45) Date of Patent: Sep. 9, 2003

(54) BREAK APART DRYWALL FINISHING SYSTEM

(76) Inventor: Timothy D. Smythe, Jr., 4017 Northcliff, Bend, OR (US) 97701

(*) Notice: Subject to any disclaimer, the term of this patent is extended or adjusted under 35 U.S.C. 154(b) by 0 days.

(21) Appl. No.: 09/978,762

(22) Filed: Oct. 16, 2001

(65) Prior Publication Data

US 2002/0023400 A1 Feb. 28, 2002

Related U.S. Application Data (63) Continuation-in-part of application No. 09/715,614, filed on Nov. 17, 2000, which is a continuation of application No. 09/191,861, filed on Nov. 12, 1998, now Pat. No. 6,148,573, which is a continuation-in-part of application No. 08/832,470, filed on Apr. 2, 1997, now abandoned, and a continuation-in-part of application No. 08/718,137, filed on Sep. 18, 1996, now abandoned, and a continuation-in-part of application No. 08/544,339, filed on Oct. 17, 1995, now abandoned.

(60) Provisional application No. 60/258,236, filed on Dec. 26, 2000.

(51) Int. Cl.$^7$ .................................................. E04B 2/00
(52) U.S. Cl. ..................... 52/287.1; 52/100; 52/255; 52/417; 52/717.03; 52/717.04; 52/745.19; 52/746.1; 428/41.7; 428/41.8; 428/61; 428/122; 428/163; 428/167; 428/174; 428/182; 428/354
(58) Field of Search .......................... 52/98–100, 254, 52/255, 287.1, 288.1, 416, 417, 741.4, 745.19, 746.1, 717.03, 777.04; 428/40.1, 41.7, 41.8, 61, 122, 156, 161, 163, 167, 174, 182, 354

(56) References Cited

U.S. PATENT DOCUMENTS

| | | | |
|---|---|---|---|
| 2,234,701 A | * | 3/1941 | Lyman |
| 2,904,856 A | * | 9/1959 | Robinson |
| 3,090,087 A | * | 5/1963 | Miller |
| 3,109,207 A | * | 11/1963 | Cooper |
| 4,149,692 A | | 4/1979 | Califano |
| 4,313,991 A | * | 2/1982 | Lamb .......................... 428/131 |
| 4,425,175 A | | 1/1984 | Moore |
| 4,793,494 A | | 12/1988 | Gordon, Jr. |
| 4,863,774 A | * | 9/1989 | Tucker ......................... 428/77 |
| 4,876,837 A | * | 10/1989 | Kelley et al. ................. 52/287 |
| 4,977,718 A | | 12/1990 | Hoffman, Sr. |
| 5,037,686 A | * | 8/1991 | Conboy ....................... 428/43 |
| 5,048,247 A | * | 9/1991 | Weldy ......................... 52/255 |
| 5,131,198 A | * | 7/1992 | Ritchie et al. ................ 52/287 |
| 5,161,533 A | | 11/1992 | Prass et al. |
| 5,244,088 A | | 9/1993 | Musil |
| 5,390,458 A | * | 2/1995 | Menchetti .................... 52/417 |
| 5,604,001 A | * | 2/1997 | Schold ....................... 428/41.8 |
| 5,613,335 A | * | 3/1997 | Rennich et al. ............... 52/255 |
| 5,740,642 A | * | 4/1998 | Koenig, Jr. et al. ........... 52/255 |
| 5,836,122 A | * | 11/1998 | Rennich et al. ............... 52/254 |
| 6,148,573 A | * | 11/2000 | Smythe, Jr. ................. 52/255 |
| 6,295,776 B1 | * | 10/2001 | Kunz et al. .................. 52/255 |

OTHER PUBLICATIONS

Co Pending 09/539,402.
Co Pending 09/780,756.
Provisional 60/258,236.

* cited by examiner

*Primary Examiner*—Carl D. Friedman
*Assistant Examiner*—Yvonne M. Horton
(74) *Attorney, Agent, or Firm*—Clifford Kraft (57) ABSTRACT

A drywall finishing system where a continuously extruded, elongated semi-rigid member with an inner and outer layer of fibrous material has a groove running end-to-end allowing the piece to assume any angle to match a drywall seam. The groove is held at a fixed angle near 89 degrees (or any other fixed angle) by a break-apart bead running in the groove. The break-apart bead can be glue or extruded plastic or other means that holds the flanges at a rigid angle. If the seam is a right angle, the piece is used without breaking the bead. If the seam is any other angle, the break-apart bead is snapped or cut apart allowing the flanges to assume any angle.

13 Claims, 6 Drawing Sheets

BREAK APART DRYWALL FINISHING SYSTEM

CROSS REFERENCE

This application is a Continuation-in-part of copending application Ser. No. 09/715,614 which is a continuation of application Ser. No. 09/191,861 filed Nov. 12, 1998 now U.S. Pat. No. 6,148,573 issued Nov. 21, 2000. Application Ser. No. 09/191,861 was a Continuation-In-Part of application Ser. No. 08/832,470 filed Apr. 2, 1997, now abandoned, and was also a Continuation-In-Part of application Ser. No. 08/718,137 filed Sep. 18, 1996, now abandoned. Both application Ser. Nos. 08/832,470 and 08/718,137 were continuations of parent application Ser. No. 08/544,339 filed Oct. 17, 1995, now abandoned. This application also claims priority from provisional patent application No. 60/258,236 filed Dec. 26, 2000 and incorporates that provisional application by reference. This application incorporates all parent applications by reference.

BACKGROUND

1. Field of the Invention

This invention relates generally to the field drywall construction and more particularly to a system of exterior and interior drywall seams and corners that greatly reduces the amount of time, labor and material required to finish a modern structure. In particular a break-apart drywall corner piece.

2. Description of Related Art

The use of gypsum drywall board in modern construction is well known. Manufactured drywall sheets are nailed to studs to form interior walls and ceilings. Before these sheets can be painted or textured, the joints must be taped and sealed with joint sealing compound (drywall mud). Drywall tape is a porous fibrous material, usually paper, which is designed to permanently bond with drywall mud.

Taping also (known as stringing) is a tedious process. First, mud and tape must be applied by hand or dispensed with a tool known as a bazooka. The worker rolls and glazes the tape while the mud is wet. As the tape strings out, it has a tendency to pull in the direction of motion. After the tape is applied, it is coated with additional mud and the edges are feathered with a wide blade drywall knife to form a smooth transition between the seam and the wall. The mud is then allowed to dry, typically overnight. Next, the seam is sanded, recoated with mud, dried and sanded again. The process is repeated if necessary until a smooth seam is produced.

Corners present a special problem. Inside corners are finished using drywall tape in much the same manner as flat joints. Outside corners are typically finished with corner beads.

Corner beads are either sharp edged or rounded nose, also known as "bullnose." These are used on exterior corners at windows and other openings. To use a standard corner bead, it first must be cut from a standard length of 8 feet or 10 feet.

The bead is nailed into position using short nails approximately every foot. The worker must: 1) keep the bead plumb or level, and 2) keep the bead at the proper angle to prevent slipping too far to one side or the other. If this latter condition occurs, a "shiner", as it is called in the trade, results. This is where the bead is too far toward one side of the corner making the other side flange hard to coat.

Once the bead is installed, the worker must "first coat" the bead. This means to coat it with mud for the first time. This is very labor intensive, and it uses a large amount of mud. The bead projects outwardly from the corner. Accordingly, when first coat is applied a wedge of mud is formed which is thickest at the bead and tapers out to meet the wall. After the first coat, the mud is allowed to dry. Drying takes about a day.

After the "first coat" is dry throughout the building, the worker has to sand this first coat of mud and clean all the metal edges. This is especially difficult with bullnose bead. After the "first coat" is sanded, the worker proceeds to "second coat" the bead repeating the entire process again and waiting another day to dry. The worker finally must again sand the bead carefully looking for imperfections, and touching these up. At this point, the bead is ready for texture or paint. The entire process uses considerable mud, and is very labor intensive, especially the sanding. In terms of total construction time, it requires two to three days to complete all the corners of a typical residence.

An alternative to fixed corner beads, especially for corners that do not meet at 90 degrees is a product known as "flex bead." Flex bead consists of two thin strips of metal bonded to a two inch paper tape. To use "flex bead", a worker first spreads all-purpose mud along the wallboard on both sides of the angle. A length of "flex bead" is folded by hand to create a crease. The bead is then installed in the angle. This requires a good eye for straight lines since the "flex bead" will not make a straight line by itself. The worker must move the bead around to the best of his abilities to set it as straight as possible. On many occasions, the worker will end up with a line that is not straight; this condition is called "snaking".

Once the "flex bead" is installed and dry, the first coat procedure is started. Most journeymen only coat one side of the angle at a time. If one tries to coat both sides at the same time, the mud flops over to the other side, and the knife digs a line into the mud on the other side of the angle. Therefore, the following process is usually used: 1) Apply a first coat of mud to one side and wait until it is dry; 2) Apply a first coat of mud to the other side and wait until it is dry; 3) Sand both sides and clean at the crease; 4) Apply a second coat of mud to one side and wait until it is dry; 5) Apply a second coat of mud to the other side and wait until it is dry; 6) Sand and touch up both sides. This process is tedious, and requires considerable time while the respective sides are drying. Accordingly, considerable drawbacks remain unsatisfied.

What is badly needed is a system for finishing drywall on the interior of buildings that avoids the difficulties of taping, corner beads and "flex bead" while retaining the perfect finished appearance that is required for texturing or painting. The sanding steps should be reduced or eliminated. This system should reduce the labor to less than one day for a typical residence and significantly reduce the amount of mud used.

SUMMARY OF THE INVENTION

The present invention relates to a drywall finishing system for finishing 1) inside and outside corners of any angle, 2) stub, end or closet walls, 3) window wrap corners, and 4) L-member for window sills and areas where a drywall ends against another surface e.g. brick. In addition, the system includes accessory products for each of the pieces mentioned. In particular the invention includes a break-apart bead.

The drywall finishing system of the invention in its most basic form is an elongated, preformed trim piece comprising a semi-rigid member having two flanges and inner and outer surfaces. The inner surface is provided with bonding means for continuously bonding the semi-rigid member to the drywall. The outer surface of the finishing member is provided with finishing means adapted to receive paint or other texture. The flanges of the semi-rigid member are tapered in a lateral direction, being thickest at the center and tapering to a thin edge.

A first preferred embodiment is a flexible trim piece, comprising a semi-ridged member having two flanges, each of the flanges being tapered to a thin lateral edge. The semi-rigid member has a longitudinal groove between the flanges forming a hinge. A covering material is bonded to the inside surface of the semi-rigid member. The covering material is preferably drywall tape for forming a good continuous bond with drywall mud between the trim piece and the drywall. A finishing material is bonded to the exterior surface of the semi-rigid member. The finishing material is preferably a fibrous material such as a paper which is suitable for directly receiving paint or other texture. The finishing material may desirably extend laterally beyond the respective side edges of the semi-rigid member forming side tabs.

To install the first embodiment of the invention, a length of preformed trim piece is selected from stock and cut to length if not exactly the right length. A flat coat of mud is applied to both sides of a drywall corner. The preformed piece is folded at the groove to match the corner, and placed over the mud and smoothed into place. Since the trim piece of the invention is preformed, the piece makes a straight line at the required angle. Once, the piece is in place, the edges are feathered or "killed" once with a small amount of mud and a wide drywall blade or knife. At that point the corner is complete except for drying. It requires little or no sanding. After the mud has dried, the finishing material can be directly textured or painted.

The present invention is placed on top of a coat of applied mud at the corner. The corner can be an exterior or interior angle. No nails are required, since the invention pieces stick to the mud. The exterior finishing material is paper, plastic, or other suitable material for receiving texture or paint. The present invention eliminates most of the intense labor associated with present methods since none of the parts need to be coated with mud or sanded. In addition, the parts form straight, finished lines and angles as soon as they are installed.

Additional embodiments of the invention include right angle outside corner trim pieces, bullnose outside corner trim pieces, stub or end wall trim pieces, U-shaped and V-shaped joint pieces, and other trim and specialty pieces including a break-apart bead.

One embodiment of the present invention relates to a break-apart bead, a rigid corner bead that can be used as a rigid bead most of the time. The most common angle is 90 degrees, so the preferred method of making the present invention is around 89 degrees to fit a 90 degree corner; however, this is not necessary to the functioning or principle of the invention and any rigid angle can be used.

As long as the installer encounters corners of the angle that the present invention is supplied in, the corner seams are installed and finished in a normal way. However, when an angle that is different that the stock piece is encountered, the present invention is snapped apart and now fits the new angle. This is accomplished by extruding a piece of flex-trim as described in U.S. Pat. No. 6,148,573. This flex-trim comprises a semi-rigid center section bonded to outer layers of paper or other fibrous material. The inside, or drywall surface, is usually made of standard drywall paper. The outside surface is prepared to receive paint or texture and can be made from cup-stock paper (like is used to manufacture paper cups). The interior semi-rigid layer is usually hi-impact polystyrene or other high impact plastic or other material. This material is usually tapered so that it is thicker in the middle and thinner at the edges. A groove or score runs longitudinally down the center of the piece forming a hinge so that, as extruded, the piece can match any angle.

The embodiment being described takes this flex-trim piece and glues, bonds, or extrudes it to a fixed rigid angle (usually around 89 degrees) after or during extrusion. This is done either by running the piece past a glue gun nozzle to lay a bead of glue along the hinge to hold it to a predetermined angle, or by causing a small connecting ridge to be formed during extrusion. The piece can also be fixed folded to the desired angle and a glue gun can be run along the piece.

The glue quickly dries forming a rigid piece formed to a fixed angle, or in the case of extrusion the piece is extruded at a fixed angle. As previously stated, as long as the installer encounters standard angles, the piece is used as a rigid piece at the fixed angle; however, when the installer encounters a non-standard angle, all that is necessary is that the installer pop or snap the piece apart breaking the small bead along the length. Now the piece again becomes a true flex-trim allowing installation at any angle.

The piece has the convenience of a rigid, fixed corner as long as that type of corner is needed and a flexible trim piece when some other angle is needed. The piece can be installed as described in U.S. Pat. No. 6,148,573 by first putting mud on both sides of a corner, pressing the piece into position, and then killing the edges with a small amount of finishing mud and a wide blade knife. The piece is then finished without further work.

When the mud is dry, the piece can directly receive paint or texture without sanding.

It should be noted that this type of piece can be made for strictly exterior trims, strictly interior trims, or for a trim that can be used on exterior and interior corners. When the piece is made for strictly exterior corners, it is usually heavier and thicker than when it is made for strictly interior corners. When the present invention is used on a trim that can be applied to either exterior or interior corners, it can be made of an intermediate thickness and weight to fit the job.

These advantages and other advantages of the present invention will become more fully apparent from the following detailed description when read in conjunction with the accompanying drawings.

BRIEF DESCRIPTION OF THE DRAWINGS

For a more complete understanding of this invention, reference should now be made to the embodiments illustrated in greater detail in the accompanying drawings and described below by way of examples of the invention.

It should be noted that many of the figures show exaggerated features such as the thickness of various members and materials. This is necessary to adequately describe and point out the features and advantages of the present invention.

DETAILED DESCRIPTION OF THE INVENTION

Description of Prior Art

Figure 1:
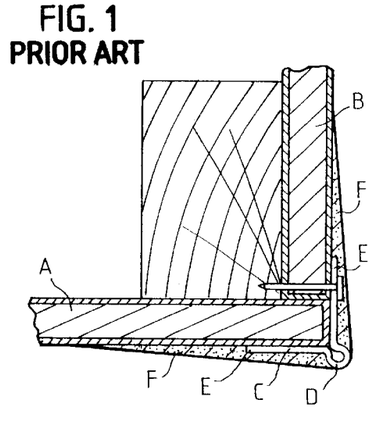
FIG. 1 is a cross-section through a prior art outside corner bead.
Figure 2:
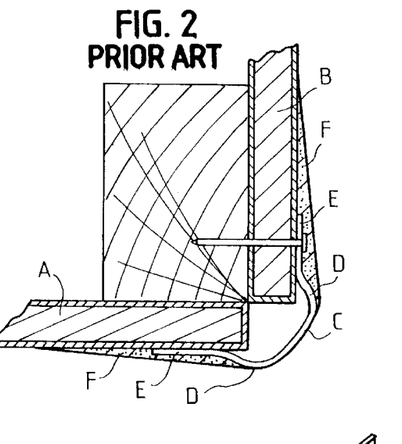
FIG. 2 is a cross-section through a prior art bullnose outside corner bead.
Figures 3, 4, 5:
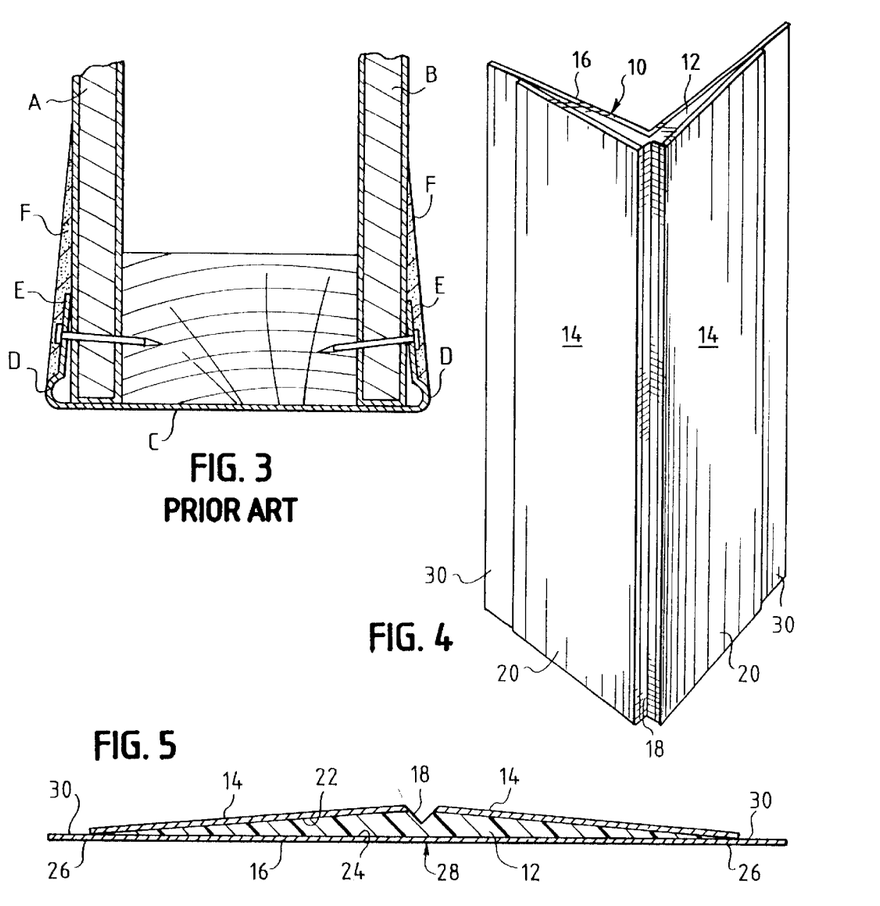
FIG. 3 is a cross-section through a prior art end wall.
FIG. 4 is an end and interior perspective view of a first embodiment of the invention comprising a flexible corner trim piece.
FIG. 5 is a cross-section of the first embodiment of the invention.
Figure 5A:
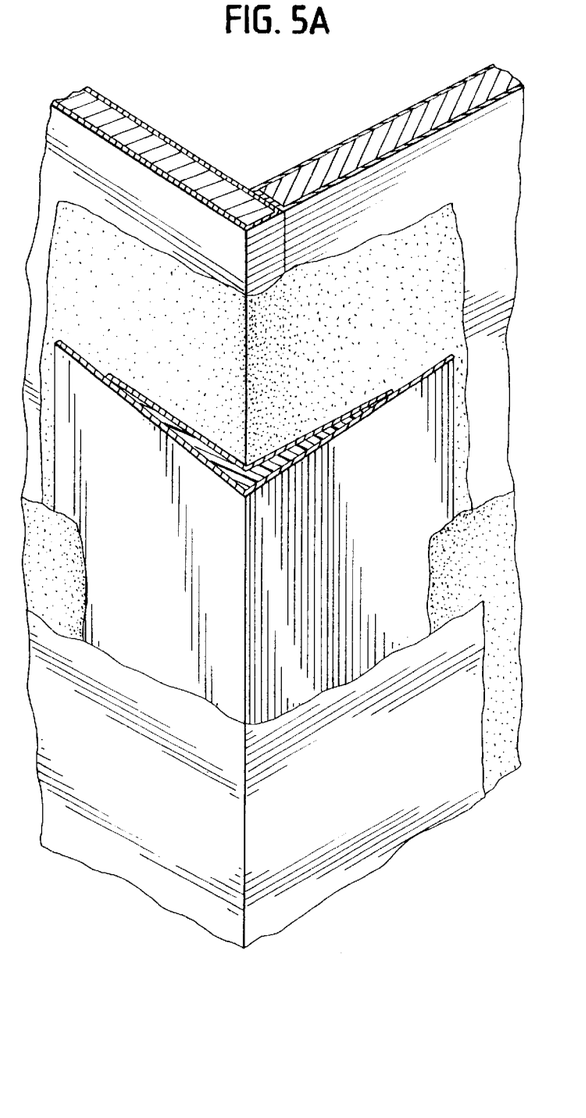
Figure 5B:
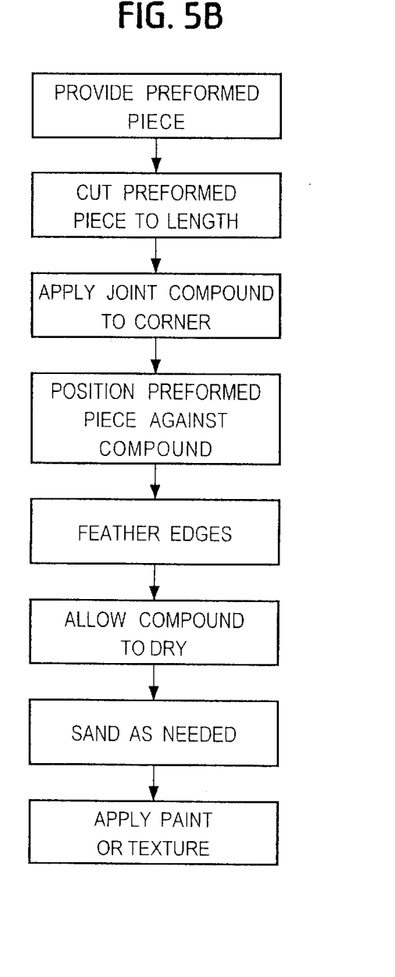

FIGS. 1–3 illustrate prior art drywall corner finishing systems. FIG. 1 shows a conventional right-angle sharp corner bead. Drywall pieces A and B join to form a corner. Corner bead C comprises bead D projecting outwardly from the wall, and two flanges E which are nailed to the drywall. A triangular wedge of drywall joint compound or mud F is formed between the drywall surfaces A and B and bead D covering flanges E. The wedges F are formed by applying a first coat of mud over the corner bead C and adjacent portions of drywall A and B. The first coat is applied with a wide flat blade drywall knife. The blade rides along bead D at an angle to the wall and spaced outwardly from flanges E.

This results in a deposit of a thick layer of mud over the flanges. Because the layer is thick it requires an extended drying time, typically over night. Moreover, the thick layer will tend to experience shrinkage and cracking while drying.

After the layer has dried, it is rough sanded. Next, a second or finish coat of mud is applied over the first coat to fill any cracks, holes or other irregularities in the first coat.

The finish coat is allowed to dry. Afterwards, the finish coat is fine sanded. Occasionally a second finish coat is required, followed by another fine sanding. The process of finishing the corner may take two or three days. The time, labor and material quantities and attendant cost required to build the corner are directly proportional to the volume of mud that forms wedges F.

FIG. 2 shows a conventional bullnose corner. The bullnose corner of FIG. 2 differs from the corner bead of FIG. 1 primarily in the radius of the corner member C. The reference letters A–F in FIG. 2 correspond to the same technical features discussed in reference to FIG. 1. One difference is that in the case of the bullnose corner two distinct ridge lines D are formed where the mud F meets the corner bullnose piece C. There is a significant arc of exposed bullnose between the two ridge lines. When finishing a bullnose corner, excess mud is commonly deposited on this exposed arc. It is thus necessary to sand the exposed arc to remove the excess mud. As with the sharp corner bead, thick wedges of mud F are built up on both sides of the corner member at significant labor and material costs. A further problem encountered with prior art corners is that cracks commonly form at the edge of the flange E, especially if the corner is banged for any reason. Traditional bullnose corners also show a ridge lines D which are aesthetical detracting. Cracks detract from the appearance of the corner.

FIG. 3 shows a conventional stub wall or closet wall piece. Again, the reference letters A–F in FIG. 3 refer to the corresponding structure previously discussed in reference to FIGS. 1 and 2. The end wall or closet member suffers the same drawbacks as the bullnose corner. Indeed, there is an ever greater surface area between ridge lines D that must be sanded to remove excess mud.

The primary drawbacks of the prior art are: (1) the labor and material costs necessary to build and finish the wedge of mud F between the member C and the drywall; (2) the significant time required to allow the mud to dry between applications, i.e., two to three days; and (3) the propensity for cracking along the edge of the flange E and the showing of ridge lines D. Each of these long standing problems in the prior art are solved by the product and method of the invention.

Description of Preferred Embodiments

Referring to FIGS. 4 and 5, a first embodiment of the present invention, that will be called "Ultra-Flex", is seen generally at 10. This embodiment can be used for inside or outside corners. Its construction is that of an elongated semi-rigid member 12 with an interior layer of covering material 14 and an exterior layer of finishing material 16 laminated thereto. The semi-rigid member 12 can be plastic, metal, or other flexible, but strong material, with high impact plastic such as that used to construct modern cola bottles being preferred. The member can be supplied in 10 or 12 foot lengths, or any other convenient length, or it can be supplied on a roll of 100 feet or any other convenient length. Running the length of the member is a groove 18. The groove divides the piece into two flanges 20 that can be repeatedly bent to form any angle from about 15 degrees to about 345 degrees. In this manner, the piece can be bent to match any inside or outside corner. The elongated semi-rigid member has a first or inside surface 22 that is split into a left part and a right part by the groove 18. It also has a second or exterior surface 24 that is continuous (the groove 18 does not penetrate all the way through). The semi-rigid member is preferably laterally tapered from a maximum thickness near the groove 18 to a minimum thickness near lateral edges 26. The maximum thickness can be between 10 mil and 120 mil near the groove and between 2 mil and 60 mil at the edges with the thickness at the edges always being less than the thickness near the center. The preferred maximum thickness is at least 64 mil, and the preferred minimum thickness is less than 10 mil.

Tapering should be distinguished from the edge bevel. The object of tapering is to form an elongated preformed wedge similar in configuration to the conventional wedges of drywall mud built in situ. See reference letter F in FIGS. 1–3.

Accordingly, the preformed, tapered semi-rigid member replaces the labor intensive, costly operations of conventional corner beads. A bevel on the other hand is an abrupt edge cut that would not materially reduce labor or material costs.

FIG. 5 is a cross-section of the "Ultra-flex" piece. The groove 18 is preferably V-shaped, and the overall cross section (without the groove) is triangular with tapering that can start anywhere. The semi-rigid member 12 gives the piece strength and support. The groove 18 forms a hinge at 28 which allows the piece to be repeatedly bent to any angle between about 15 and 345 degrees. If the material chosen for the semi-rigid member is high-impact plastic, bending does not fatigue the hinge, and the member can be bent any number of times without breaking. Also, the member in that manner is extremely strong and can resist numerous direct blows to its surface and hinge 28 without any damage.

The groove 18 separates the first surface 22 of the piece into a left half and a right half. These two halves do not have to be the same width. In fact, one of the halves can be considerably wider than the other to form an L-trim member or similar type member if desired. The first surface 22 of the semi-rigid member 12 can be covered by two strips of covering material 14 firmly bonded to the semi-rigid member 12. This covering material can be paper similar to that used on drywall, or joint tape paper, or other suitable material adapted for forming a continuous bond to drywall with mud. It should be noted that adhesive other than drywall mud could be used to attach the present invention to drywall; however, the preferred method is to use only drywall mud. Also it should be noted that the groove 18 can normally be formed during extrusion of the semi-rigid member 12; however, it is also possible to form it using a scoring tool or a set of male/female scoring tools. The preferred method is to extrude the semi-rigid member 12 and use an extrusion die to form the groove 18.

The second surface 24 of the semi-rigid member can be covered by a strip of finishing material 16 also firmly bonded to the semi-rigid member 12. The finishing material preferably extends laterally beyond the edges of the semi-rigid member forming side tabs 30. The side tabs 30 are adapted to be adhered to the drywall. The finishing material can be cup stock paper having an outer surface that can directly receive paint or texture. It can be any other material that can directly receive paint or texture without the need of sanding or mud.

Both the covering material and finishing material layers are bonded to the semi-rigid member. By bonded, what is meant is any process that firmly attaches the material to the member. Glue could be used, but it is preferable to extrude the entire piece with the semi-rigid member being high impact plastic. Here, the plastic with the groove and both paper layers are laminated together with the plastic being hot melted to the paper layers for a permanent bond. The groove 18 can be made with an extrusion die.

The first embodiment shown in FIGS. 4 and 5 is only one way of making this type of piece. The piece can be made with any number of grooves to form flexible specialty pieces. In particular, it can be constructed with two grooves to form a stub or end wall piece. Also, the groove can be of other suitable cross sections as required. One great advantage of this embodiment is that the groove allows the piece to be bent to form perfect corners. There is no "snaking" of the corner line, even on uneven walls or construction. Also, since this type of piece can be used at any angle, it can be used anywhere in a modern building.

It is also possible to make the first embodiment with the semi-rigid member very thin to be extra-flexible for use primarily in interior corners with angles less than or equal to 90 degrees. This embodiment may have a constant, rather than tapered, cross section. Pieces for interior angles greater than 90 degrees must be much stronger since it has been discovered that if a flexible piece is used for such an angle, the shrinkage of the mud coupled with building movement causes the entire piece to deform and shift leading to unacceptable work.

The "Ultra-Flex" and other pieces can be supplied on rolls as well as in precut lengths. In order that long pieces of the material can be put together end-to-end, it is possible in manufacture to stamp approximately 1 inch on the back of the material on one end of the product with a half cut enabling the user to peel off the plastic and back paper (or other fibrous material) leaving only the front paper (or other fibrous material). In this way pieces can be joined end-to-end seamlessly. This aspect of the invention will be further discussed in reference to FIG. 24.

Figures 6, 7:
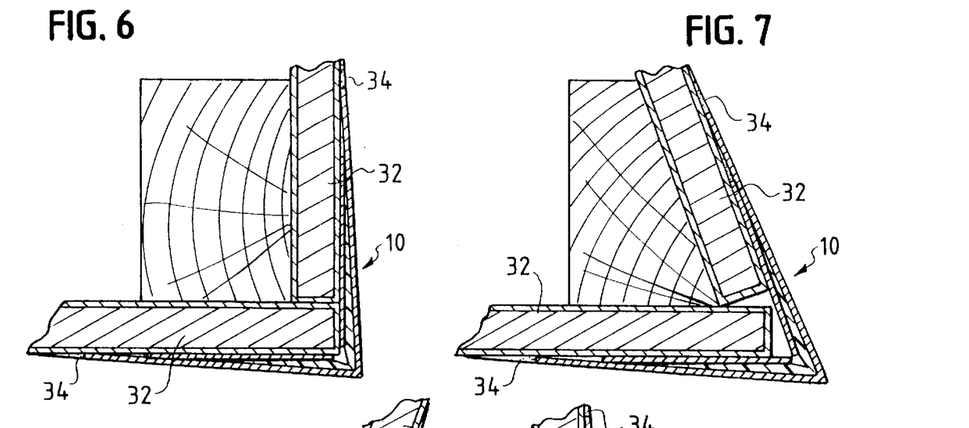
FIG. 6 is a cross-section of the first embodiment applied to a right-angle, outside drywall corner.
FIG. 7 is a cross-section of the first embodiment applied to an acute angle outside drywall corner.
Figure 8:
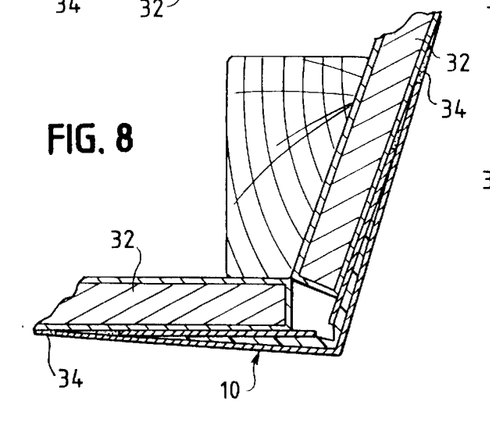
FIG. 8 is a cross-section of the first embodiment applied to an obtuse angle, outside drywall corner.
Figure 9:
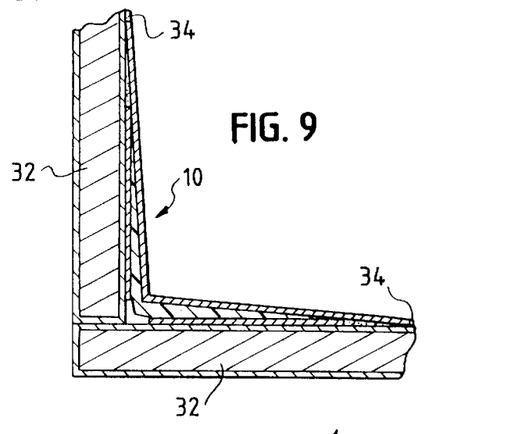
FIG. 9 is a cross-section of the first embodiment applied to an inside drywall corner.

FIGS. 6–9 illustrate the first embodiment of the trim piece of the invention applied to a variety of different drywall corners. FIG. 6 shows a right angle outside corner made with the trim piece of the invention. The trim piece 10 is applied to drywall 30 with conventional drywall compound or mud as discussed in greater detail below. The edges between the piece 10 and drywall 32 is feathered or "killed" with mud 34 to provide a smooth surface. Note, however, that there is a marked reduction in the amount of mud utilized as compared to the prior art corner FIG. 1. FIGS. 7, 8 and 9 show the same features and benefits with respect to acute, obtuse and inside corners, respectively.

A method of installing the first embodiment of the invention is as follows. A worker first applies drywall mud to both side walls of the corner to be finished. The pre-formed trim piece is cut to length and placed in the corner against the wet mud. The piece is positioned for final appearance and pressed into place; then, the excess mud can be wiped or rolled out, and finally the edges are "killed" by applying a small amount of finishing mud to the edges and smoothing them with a wide blade knife so that they merge into the surrounding drywall. There is no further finishing. When the mud dries, the corner is ready for painting or texturing. This represents a considerable savings in time and money over existing methods.

Figure 10:
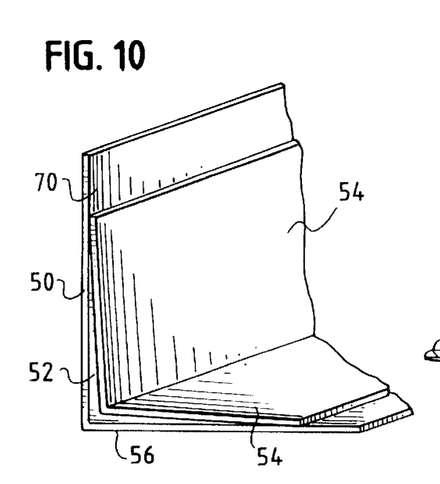
FIG. 10 is a perspective view of a second embodiment of the invention comprising an outside right angle corner piece.
Figure 11:
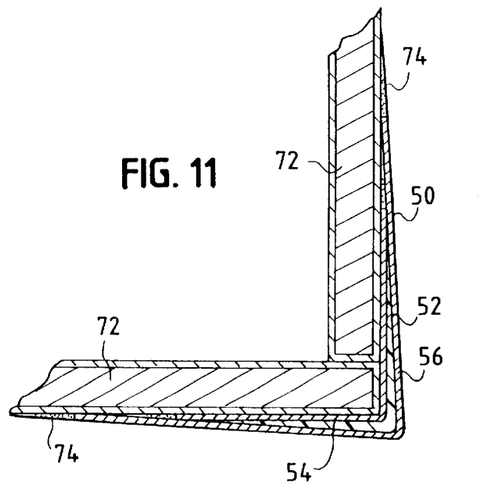
FIG. 11 is a cross-section of the second embodiment applied to an outside drywall corner.

A second embodiment is illustrated in FIGS. 10 and 11 comprising a fixed, right angle outside corner piece. The second embodiment trim piece can be constructed using the techniques discussed in relation to the first embodiment, but without the groove. The piece is made with an extruded fixed angle of near 89 degrees or any other desired angle. The angle is somewhat less than 90 degrees so the trim piece will slightly grip the dry wall and applied mud. This piece is ready to receive paint or texture and is installed by simply placing it on wet mud, aligning it correctly, pressing it into place, wiping or rolling out the excess mud, and then killing or feathering the edges with a small amount of mud. Such a piece takes the place of current exterior drywall corner pieces (see FIG. 1) leading to a perfectly sculptured preformed corner without the extreme labor associated with building up mud, sanding, and finishing conventional corners.

The right angle corner trim piece 50 comprises an elongated semi-rigid member 52 with an interior layer of covering material 54 and an exterior layer of finishing material 56. The semi-rigid member 52 is preformed with a permanent right angle between flanges 60. The flanges are each laterally tapered from a maximum thickness at the corner 58 to a minimum thickness near lateral edges 66. Tapering can start at the corner or it can start a distance away from the corner 58.

The first or inside surface of semi-rigid member 52 is covered with two strips of covering material 54 firmly bonded to the semi-rigid member as described in reference to the first embodiment. Similarly, the second or outside surface of semi-rigid member is covered with a strip of finishing material 56 also firmly bonded to the semi-rigid member. As described in reference to the first embodiment, the finishing material extends laterally beyond the edges of the semi-rigid member forming side tabs 70.

FIG. 11 shows the trim piece of the second embodiment installed on a drywall outside corner. Drywall sheets 72 form a conventional right angle, outside corner. The trim piece 50 is continuously adhered to the drywall with mud as described above.

The edges between the trim piece 50 and drywall 72 are feathered with a relatively small quantity of mud 74 to provide a smooth surface. The exterior surface of the trim piece is not coated with mud, however, as was customary with prior art corner beads.

Compare FIG. 11 to FIG. 1. There is a dramatic reduction in the amount of drywall mud utilized—up to 75% less mud. The reduction in the quantity of mud directly translates to corresponding dramatic reductions in the amount of drying time and labor.

Figures 12, 13, 14, 15, 16:
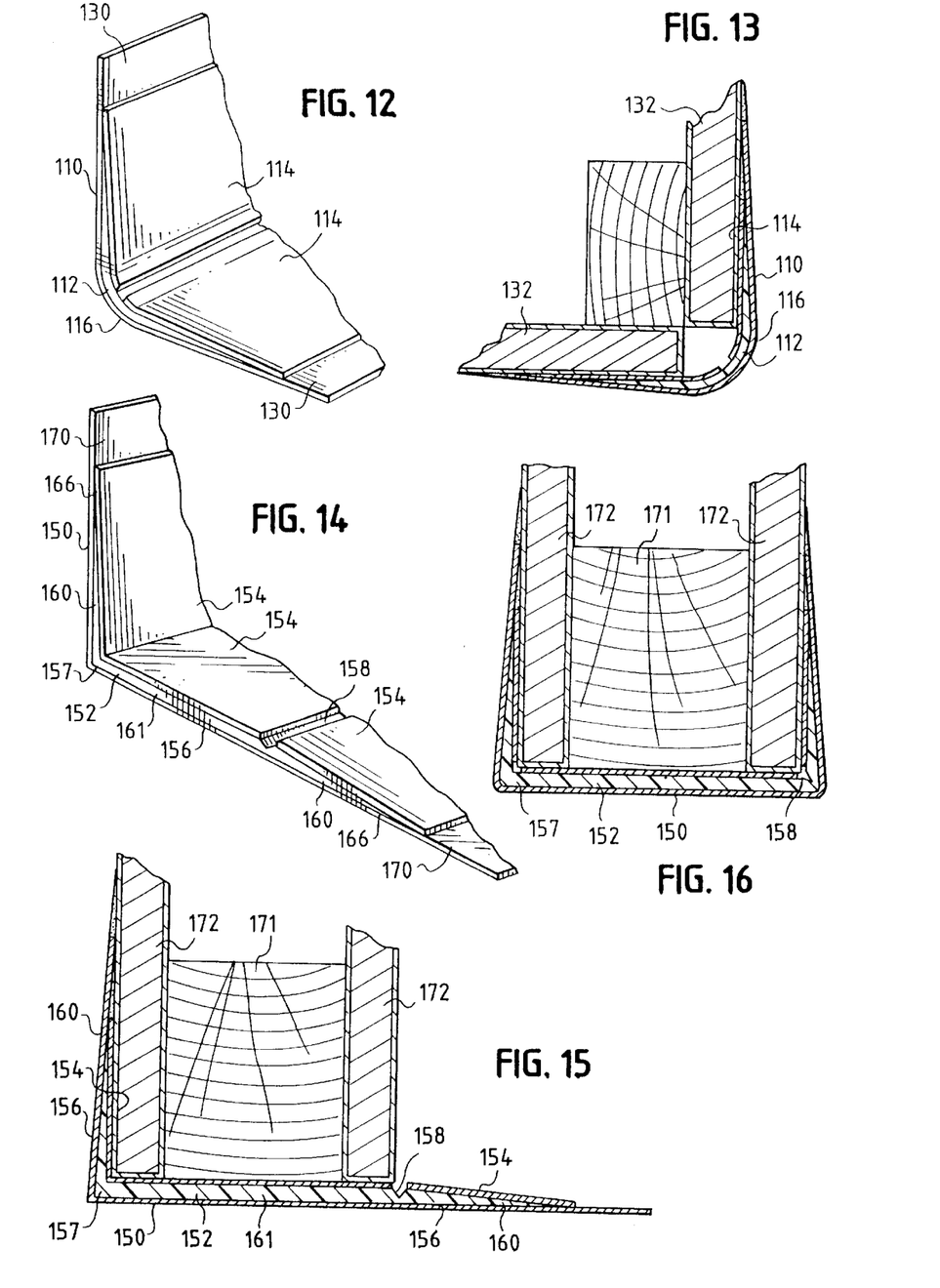
FIG. 12 is a perspective view of a third embodiment of the invention comprising an outside right angle bullnose corner piece.
FIG. 13 is a cross-section of the third embodiment of the invention applied to an outside corner.
FIG. 14 is a perspective view of a fourth embodiment of the invention comprising an end wall trim piece.
FIG. 15 is a cross-sectional view of the fourth embodiment partially applied to an end stub wall.
FIG. 16 is a cross-sectional view of the fourth embodiment fully applied to an end wall.

FIGS. 12 and 13 illustrate a third embodiment of the trim piece 110 of the invention comprising a rounded or bullnose right angle outside corner piece. Trim piece 110, as with the first two embodiments, comprises a semi-rigid member 112 with an interior layer of covering material 114 and an exterior layer of finishing material 116 laminated thereto. The semi-rigid member 112 can be preformed with a permanent 88–90 radius 118. The exact angle is not critical and can be preformed to other angles encountered in the field such as 135 degrees, or any other angle. The preferred material is high impact plastic, with a uniform thickness of 0.057 inches in the radius. The radius is a true circular arc—there are no ridges or beads. The semi-rigid member 112 further comprises flanges 120 that can taper laterally from a maximum thickness at radius 118 to a minimum thickness near lateral edges 126, or can taper laterally from maximum thickness at a point slightly away from the radius 118 to a minimum thickness near lateral edges 126.

As with the first two embodiments, strips of covering material 114 are bonded to the first or interior surface of the semi-rigid member and finishing material 116 is bonded to the second or exterior surface. The finishing material extends laterally from the semi-rigid member forming side tabs 130.

FIG. 13 shows trim piece 110 installed on a right angle drywall outside corner. Trim piece 110 is continuously bonded to drywall 132 with conventional drywall mud. The edges 134 between the side tabs and drywall surface are feathered with a small amount of mud. The exterior surface of trim piece 110 is substantially free from mud and suitable for directly receiving paint or texture. Because the trim piece 112 is a true, preformed radius, there are no ridge lines as are common in the prior art. Compare FIG. 13 to FIG. 2.

FIGS. 14–16 illustrate a fourth embodiment of the trim piece 150 of the invention. Trim piece 150 is specifically adapted for end walls, such as closet openings. A normal closet opening having a top wall and two side walls will require six lengths of conventional corner bead and nine surfaces to coat with a minimum of two coats of mud. The trim piece 150 is used to finish a closet opening in a single operation.

Trim piece 150 comprises an elongated semi-rigid member 152 having an interior layer of covering material 154 and an exterior layer of finishing material 156 laminated thereto. Trim piece 150 is preformed with flanges 160, and a center portion 161 between the flanges. The flanges are each laterally tapered from a maximum thickness adjacent center portion 161 to a minimum thickness near lateral edges 166. Trim piece 150 is preformed with a permanent right angle at 157 between one flange 160 and center portion 161. Running the length of the member is a groove 158 between center portion 161 and the other flange 160. The groove 158 forms a hinge so that the other flange may be rotated relative to the center portion. In addition, there can be two grooves instead of a groove and a right angle 157. The right angle 157 can be replaced by the second groove. In this case, the piece can be made flat.

The center piece 161 can be different widths (distance between the flanges 160) depending on the construction. In the case of a 3½ inch stud and two ½ sheets of drywall, the center piece would be around 4½ inches wide. In the case of the same stud with two ⅝ sheets of drywall, the width would be around 4¾ inches. Different versions of this piece can be made for typical construction situations; specialized versions can be made for any situation. The width of the flanges 160 can be between 1 inch and 12 inches, with about 2¼ inches being preferred. The thickness of the center piece 161 can be from around 20 thousands of an inch to around ½ inch to form a finished wall. This thickness is not critical to the invention, and many other thickness are possible.

FIG. 15 shows trim piece 150 partially installed on an end wall. The end wall is formed by a stud 171 and drywall sheets 172. Trim piece 150 is installed by first applying mud continuously to both the sides and end of the end wall. The preformed corner portion of the trim piece is then pressed firmly in place. The edge between the fixed flange 160 and the drywall is feathered. Next, as shown in FIG. 16, the other flange 160 is rotated about hinge 158 and pressed into the wet mud to complete the corner. The remaining edge is feathered. Thereby, the end wall is finished in a single operation.

Figure 17:
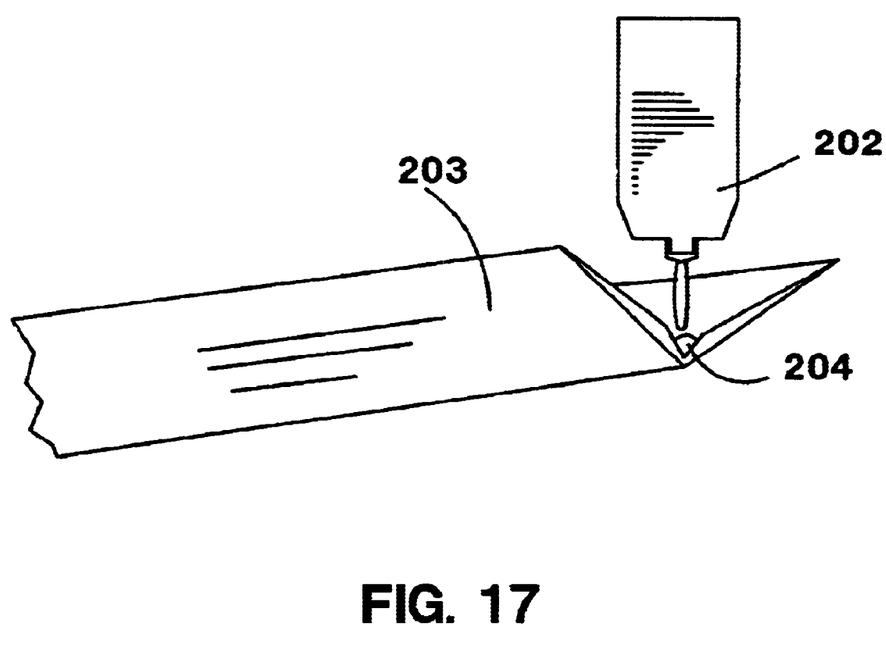
FIG. 17 shows application of glue to a standard flex-trim piece to produce a break-apart bead.

FIG. 17 shows a standard flex-trim piece 201 set to a predetermined angle. Glue 205 is applied along the longitudinal axis of the piece with a standard glue gun 202. The gun 202 can be moved along the piece 201 or the piece 201 can be moved past the gun 202. The preferred angle for a 90 degree corner piece is around 89 degrees. The preferred glue is a plastic hotmelt glue manufactured by 3M Corporation; however, any similar glue or adhesive is within the scope of the present invention.

The separable, flexible drywall trim piece of FIG. 1 is made up of a semi-rigid layer that preferably is high impact polystyrene plastic that is elongated. This piece is extruded and bonded to an inner and outer fibrous layer. The inner fibrous layer can be standard drywall paper and is made to be in contact with the drywall after installation. The outer layer is a fibrous material prepared to directly receive paint or texture and is preferably cup-stock paper. Any other suitable materials are within the scope of the present invention. Also, the outer surface can also receive drywall mud which can then be sanded in the conventional way. The cross section of the semi-rigid member can be tapered or beveled or both to better merge into the drywall at its edges.

A groove and/or score can run the length of the piece near the center (or anywhere on special pieces) that forms a hinge so that the piece can normally flex to any angle. The present invention then locks the angle either by gluing a bead along the groove or score or by extruding a small plastic bead or ridge to prevent folding. Any method of forming a hinge is within the scope of the present invention, and any method of locking the angle where it can be snapped apart is also within the scope of the present invention.

Figure 18:
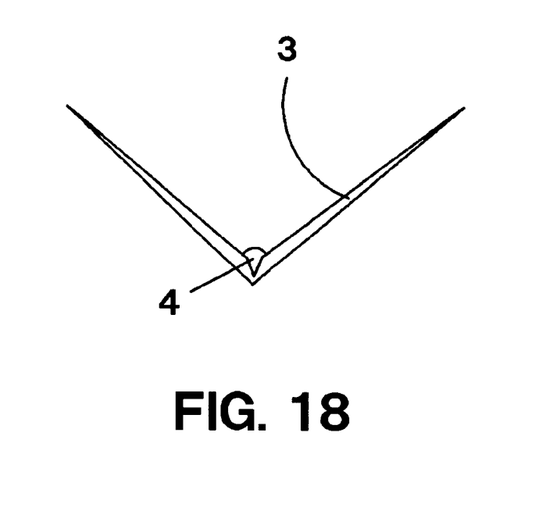
FIG. 18 shows a cross-section of a rigid piece with glue or and extruded bead in place.

FIG. 18 shows a stock drywall trim piece 203 that is glued up or extruded to be used in a 90 degree corner. The piece has a break-apart bead 204 running the length of the groove. As previously stated, the preferred rigid angle is for this corner is around 89 degrees. As long as the worker encounters 90 degree corners, he simply uses the rigid pieces at the fixed, glued angle. However, when he encounters a corner that is at a different angle, he breaks the bead 204 along the longitudinal axis by snapping it apart. This can be done by hand or with a tool. The piece then becomes a standard flex-trim piece which will fit any angle. The break-apart bead can be made from glue or it can be made as an extrusion of a small plastic bead along the groove during manufacture.

Figure 19:
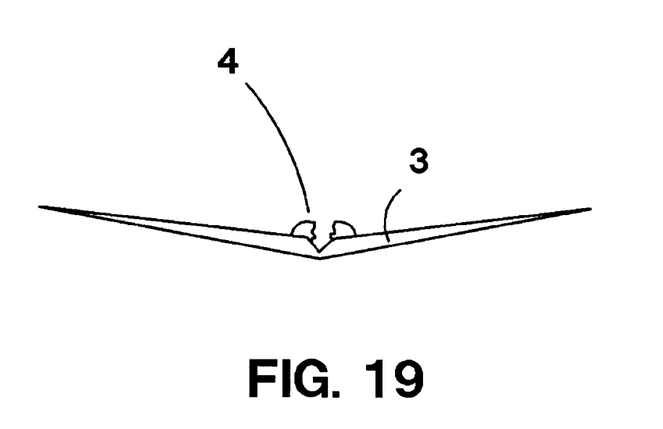
FIG. 19 shows a cross section of the embodiment of FIG. 18 after the bead has been broken.

FIG. 19 shows the piece 203 with the bead 204 snapped apart. The piece now acts as a flexible hinge so that the piece can fit a corner of any angle. The piece can be snapped apart by hand, re-scored, or separated with a special tool. The preferred way is to snap the piece apart by hand breaking the bead 204.

While the preferred embodiments of the present invention have been shown and described, it is to be understood that various modifications and changes could be made thereto without departing from the scope of the appended claims.

What is claimed is:

1. A separable flexible drywall trim piece comprising:
   a elongated semi-rigid member bonded to an inner layer of fibrous material and an outer layer of fibrous material, said outer layer receiving paint or texture directly, said semi-rigid member forming a left and a right flange;
   a groove running the length of said elongated semi-rigid member, said groove forming a hinge between said left flange and said right flange allowing said flanges to flex to any angle;
   a break-apart bead running the length of said groove, said bead holding the angle between said flanges fixed at a predetermined angle, said bead being broken by snapping said flanges apart allowing said flanges to assume any angle.

2. The separable flexible drywall trim piece of claim 1 wherein said semi-rigid member is high impact polystyrene plastic.

3. The separable flexible drywall trim piece of claim 1 wherein said break-apart bead is glue.

4. The separable flexible drywall trim piece of claim 1 wherein said break-apart bead is extruded plastic.

5. The separable flexible drywall trim piece of claim 1 wherein said fibrous outer and inner layer is paper.

6. The separable flexible drywall trim piece of claim 5 wherein said fibrous inner paper layer is cup stock paper.

7. An apparatus for finishing drywall seams of the type where wet drywall mud is first placed on both sides of a seam and the apparatus is pushed into the wet mud, the mud holding the apparatus in place while the edges are feathered into the surrounding drywall with mud, the apparatus not receiving mud on a front surface, but rather receiving paint or texture directly on said front surface, said apparatus comprising, in combination: an elongated, continuously extruded semi-rigid support member with an inner and outer paper layer, the outer paper layer being prepared to directly receive paint or texture; a groove running end-to-end acting as a hinge allowing the apparatus to match any wall angle; a break-apart bead running end-to-end in said groove, said break-apart bead holding said apparatus at a fixed, manufactured angle of around 89 degrees; said break-apart bead being snapped apart if necessary so said apparatus matches angles other than a right angle.

8. The apparatus of claim 7 wherein said break-apart bead is glue.

9. The apparatus of claim 7 wherein said break-apart bead is plastic continuously extruded with said apparatus.

10. A drywall finishing apparatus comprising:
    a continuously extruded elongated semi-rigid member with two flanges, each of said flanges having an inner and an outer layer of fibrous material;
    a groove running end-to-end along a centerline forming a hinge allowing said flanges to assume any angle;
    a means for holding said flanges at a rigid angle of around 89 degrees running end-to-end along said groove, said means for holding said flanges being snapped apart if necessary allowing said flanges to assume any angle.

11. The drywall finishing apparatus of claim 10 wherein said elongated semi-rigid member is high-impact polystyrene.

12. The drywall finishing apparatus of claim 10 wherein said means for holding said flanges is glue.

13. The drywall finishing apparatus of claim 10 wherein said means for holding said flanges is a plastic extrusion.

* * * * *